United States Patent
Gagne-Keats et al.

(10) Patent No.: US 11,979,495 B1
(45) Date of Patent: May 7, 2024

(54) PORTABLE MEMORY DEVICE CONFIGURED FOR HOST DEVICE TO MANAGE ACCESS TO DIGITAL ASSETS

(71) Applicant: OSOM Products, Inc., Cupertino, CA (US)

(72) Inventors: Jason Sean Gagne-Keats, Cupertino, CA (US); Gary Anderson, San Mateo, CA (US)

(73) Assignee: OSOM PRODUCTS, INC., Cupertino, CA (US)

( * ) Notice: Subject to any disclaimer, the term of this patent is extended or adjusted under 35 U.S.C. 154(b) by 0 days.

(21) Appl. No.: 18/061,915

(22) Filed: Dec. 5, 2022

Related U.S. Application Data

(60) Provisional application No. 63/384,403, filed on Nov. 18, 2022.

(51) Int. Cl.
  *G06F 21/62* (2013.01)
  *G06Q 20/36* (2012.01)
  *H04L 9/08* (2006.01)
  *H04L 9/32* (2006.01)

(52) U.S. Cl.
  CPC ........ *H04L 9/0877* (2013.01); *G06F 21/6209* (2013.01); *G06Q 20/3674* (2013.01); *H04L 9/3231* (2013.01); *H04L 9/085* (2013.01); *H04L 2209/60* (2013.01)

(58) Field of Classification Search
  CPC .... H04L 9/0877; H04L 9/085; G06F 21/6209
  See application file for complete search history.

(56) References Cited

U.S. PATENT DOCUMENTS

| | | | | |
|---|---|---|---|---|
| 2006/0069925 | A1* | 3/2006 | Nakai | G11B 20/00188 713/193 |
| 2007/0054655 | A1* | 3/2007 | Fantini | H04W 12/069 455/411 |
| 2008/0114958 | A1* | 5/2008 | Jogand-Coulomb | G06F 21/10 711/164 |
| 2010/0048169 | A1* | 2/2010 | Yan | G06F 21/78 709/201 |

(Continued)

OTHER PUBLICATIONS

United States Patent & Trademark Office (USPTO), International Search Report and Written Opinion, PCT/US2022/080941, dated Mar. 15, 2023, counterpart U.S. Appl. No. 18/061,915.

Primary Examiner — David J Pearson
(74) Attorney, Agent, or Firm — Perkins Coie LLP; Alberto Araiza; Anna Onley

(57) ABSTRACT

An example apparatus includes a flash memory card that is removably and securely coupled to a host device (e.g., smartphone). When removed, the apparatus facilitates physical and logical air-gapping and secure, "cold" storage of digital assets. In one example, a flash memory card stores computer-executable instructions to determine that a mobile device is authorized to communicate with the flash memory card when the flash memory card is inserted into a memory card slot of the mobile device. If communication is authorized, the instructions can further cause the memory card to establish communication with the mobile device and cause the mobile device to access a digital asset using a key stored on the memory card. The digital asset can be digitally managed in response to receiving user input at the mobile device.

26 Claims, 7 Drawing Sheets

(56) References Cited

U.S. PATENT DOCUMENTS

| | | | |
|---|---|---|---|
| 2010/0312926 A1* | 12/2010 | Arya | H04M 1/72409 |
| | | | 370/278 |
| 2013/0283040 A1* | 10/2013 | Tu | H04W 4/60 |
| | | | 726/5 |
| 2014/0136350 A1* | 5/2014 | Savolainen | G06Q 20/341 |
| | | | 705/17 |
| 2014/0357318 A1* | 12/2014 | Li | H04M 1/275 |
| | | | 455/558 |
| 2015/0331609 A1* | 11/2015 | Jedema | G06F 3/0679 |
| | | | 711/104 |
| 2016/0261411 A1* | 9/2016 | Yau | G06Q 20/38215 |
| 2018/0114036 A1 | 4/2018 | Spodak et al. | |
| 2019/0121988 A1* | 4/2019 | van de Ruit | H04L 9/0825 |
| 2019/0325408 A1* | 10/2019 | Goroff | G06Q 20/3825 |
| 2020/0076606 A1* | 3/2020 | Burke | H04L 63/0853 |
| 2020/0145216 A1 | 5/2020 | Clark et al. | |
| 2020/0193420 A1 | 6/2020 | Vogel et al. | |
| 2021/0083872 A1* | 3/2021 | Desmarais | H04L 9/3247 |
| 2021/0119781 A1* | 4/2021 | Liu | H04L 9/3239 |
| 2021/0182806 A1 | 6/2021 | Ornelas et al. | |
| 2021/0398134 A1* | 12/2021 | Dumas | G06Q 20/3674 |
| 2022/0147974 A1* | 5/2022 | Law | H04L 9/3239 |
| 2023/0031621 A1* | 2/2023 | Pepe | H04L 9/3231 |

\* cited by examiner

US 11,979,495 B1

PORTABLE MEMORY DEVICE CONFIGURED FOR HOST DEVICE TO MANAGE ACCESS TO DIGITAL ASSETS

CROSS-REFERENCE TO RELATED APPLICATION(S)

This application claims the benefit of U.S. Provisional Application No. 63/384,403, filed on Nov. 18, 2022, entitled "PORTABLE MEMORY DEVICE CONFIGURED FOR HOST DEVICE TO MANAGE ACCESS TO DIGITAL ASSETS," which is hereby incorporated by reference in its entirety.

TECHNICAL FIELD

The disclosed technology relates to techniques for managing digital assets.

BACKGROUND

A digital wallet is an electronic device, online service, or software program that allows one party to make electronic transactions with another party bartering digital currency units for goods and services. This can include purchasing items either online or at the point of sale in a brick-and-mortar store, using either mobile payment (on a smartphone or other mobile device) or, for online buying, using a laptop or other personal computer. Money can be deposited in the digital wallet prior to any transaction or an individual's bank account can be linked to the digital wallet. Users might also have their driver's license, health card, loyalty card(s) and other ID documents stored within the wallet. The credentials can be passed to a merchant's terminal wirelessly via near field communication (NFC). In one example, a cryptographic wallet is a digital wallet where private keys are stored for cryptographic assets like bitcoin.

BRIEF DESCRIPTION OF THE DRAWINGS

Detailed descriptions of implementations of the present technology will be described and explained through the use of the accompanying drawings.

Figure 1:
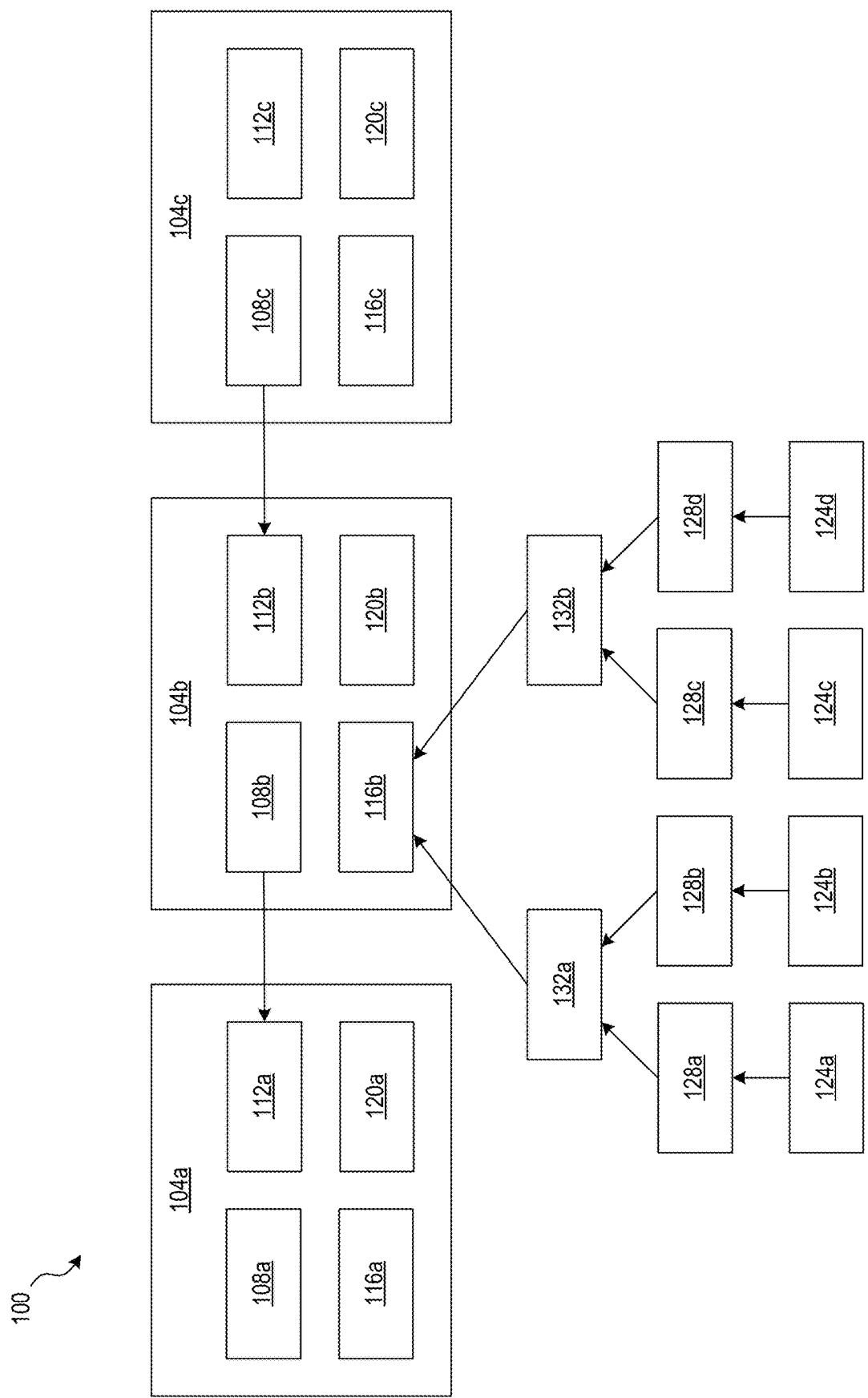
FIG. 1 is a block diagram illustrating an example structure including a portion of a blockchain.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology includes methods, apparatuses, and systems for securely managing access to digital assets (e.g., cryptographic assets, digital coins, digital tokens, non-fungible tokens (NFTs)). In some embodiments, an example apparatus corresponds to a memory device that is removably and securely paired to a host device (e.g., a smartphone). When removed, the apparatus facilitates physical and logical air-gapping and secure, "cold" storage of digital assets. An example apparatus can be a flash memory card storing computer-executable instructions to determine that a mobile device is authorized to communicate with the flash memory card when the flash memory card is inserted into a memory card slot of the mobile device. If communication is authorized, the instructions can further cause the memory card to establish communication with the mobile device and cause the mobile device to access a digital asset using a key contained in a secure digital wallet that is stored on the memory card. The digital asset can be digitally managed in response to receiving user input at the mobile device.

Embodiments of the present disclosure are described thoroughly herein with reference to the accompanying drawings. Like numerals represent like elements throughout the several figures, and in which example embodiments are shown. However, embodiments of the claims can be implemented in many different forms and should not be construed as limited to the embodiments set forth herein. The implementations set forth herein are non-limiting examples among other possible examples.

Throughout this specification, plural instances (e.g., "610") can implement components, operations, or structures (e.g., "610*a*") described as a single instance. Further, plural instances (e.g., "610") can refer collectively to a set of components, operations, or structures (e.g., "610*a*") described as a single instance. The description of a single component (e.g., "610*a*") applies equally to a like-numbered component (e.g., "610*b*") unless indicated otherwise. These and other aspects, features, and implementations can be expressed as methods, apparatuses, systems, components, program products, means or steps for performing a function, and in other ways. These and other aspects, features, and implementations will become apparent from the following description, including the claims.

The advantages and benefits of the technology disclosed herein include the reduction of security vulnerabilities with respect to both Internet-of-things (IoT) devices as well as network systems when compared to traditional methods. The disclosed methods improve fidelity of data transferred, authentication of users attempting to access sensitive data, and/or the like. For example, the methods may be used to ascertain that data being transmitted and received is correct and not tampered with. Similarly, the methods may be used to ensure that sensitive information is only being shared with appropriate authorized users (e.g., doctors) and shared by the correct party.

The disclosed technology includes a digital wallet stored on a portable memory device ("memory device") that can be physically separated from and/or capable of being removably coupled to its host device. The ability to physically and communicatively uncouple the digital wallet from the host device and other devices enables the air-gapped digital wallet to act as security-enhancing "cold" storage of digital assets, where the stored digital assets are moved offline and become inaccessible to the host device and other devices. In addition, the disclosed technology prevent security failures that can occur due to human error when compared to traditional systems. Further, advantages of the disclosed machine learning (ML) implementations can reduce memory footprint and improve performance.

FIG. 1 is a block diagram illustrating a portion of an example blockchain system 100. Blockchain system 100 includes blockchain 104. In embodiments, the blockchain 104 is a distributed ledger of transactions (e.g., a continuously growing list of records, such as records of transactions for digital assets such as cryptocurrency, bitcoin, or electronic cash) that is maintained by a blockchain system 100. For example, the blockchain 104 is stored redundantly at multiple nodes (e.g., computers) of a blockchain network. Each node in the blockchain network can store a complete replica of the entire blockchain 104. In some embodiments, the blockchain system 100 implements storage of an identical blockchain at each node, even when nodes receive transactions in different orderings. The blockchain 104 shown in FIG. 1 includes blocks 104a, 104b, 104c. Likewise, embodiments of the blockchain system 100 can include different and/or additional components or be connected in different ways.

The terms "blockchain" and "chain" are used interchangeably herein. In some embodiments, the blockchain 104 is a distributed database that is shared among the nodes of a computer network. As a database, the blockchain 104 stores information electronically in a digital format. The blockchain 104 can maintain a secure and decentralized record of transactions (e.g., transactions 124a, 124b). For example, the ERC-721 or ERC-1155 standards are used for maintaining a secure and decentralized record of transactions. The blockchain 104 provides fidelity and security for the data record. In embodiments, blockchain 104 collects information together in groups, known as "blocks" (e.g., blocks 104a, 104b) that hold sets of information.

The blockchain 104 structures its data into chunks (blocks) (e.g., blocks 104a, 104b) that are strung together. Blocks (e.g., block 104c) have certain storage capacities and, when filled, are closed and linked to a previously filled block (e.g., block 104b), forming a chain of data known as the "blockchain." New information that follows a freshly added block (e.g., block 104b) is compiled into a newly formed block (e.g., block 104c) that will then also be added to the blockchain 104 once filled. The data structure inherently makes an irreversible timeline of data when implemented in a decentralized nature. When a block is filled, it becomes a part of this timeline of blocks. Each block (e.g., block 104a) in the blockchain 100 is given an exact timestamp (e.g., timestamp 112a) when it is added to the blockchain 100. In the example of FIG. 1, blockchain 104 includes multiple blocks 104a-c. Each of the blocks 104a-c can represent one or multiple transactions and can include a cryptographic hash of the previous block (e.g., previous hashes 108a-c), a timestamp (e.g., timestamps 112a-c), a transactions root hash (e.g., 116a-c), and a nonce (e.g., 120a-c). A transactions root hash (e.g., transactions root hash 116b) indicates the proof that the block 104b contains all the transactions in the proper order. The transactions root hash 116b proves the integrity of transactions in the block 104b without presenting all transactions.

In some embodiments, the timestamp 112a-c of each of corresponding blocks 104a-c includes data indicating a time associated with the block. A timestamp can include a sequence of characters that uniquely identifies a given point in time. In one example, the timestamp of a block includes the previous timestamp in its hash and enables the sequence of block generation to be verified.

In some embodiments, the nonces 120a-c of each of corresponding blocks 104a-c include any generated random or semi-random number. The nonce can be used by miners during proof of work (PoW), which refers to a form of adding new blocks of transactions to the blockchain 104. The work refers to generating a hash that matches the target hash for the current block. In one example, a nonce is an arbitrary number that miners (e.g., devices that validate blocks) can change in order to modify a header hash and produce a hash that is less than or equal to the target hash value set by the network.

As described above, each of blocks 104a, 104b, 104c of the blockchain 104 can include respective block hash 116a, 116b, 116c. Each of block hashes 116a-c can represent a hash of a root node of a Merkle tree for the contents of the block (e.g., the transactions of the corresponding block). For example, the Merkle tree contains leaf nodes corresponding to hashes of components of the transaction, such as a reference that identifies an output of a prior transaction that is input to the transaction, an attachment, and a command. Each non-leaf node can contain a hash of the hashes of its child nodes. The Merkle tree can also be considered to have each component as the leaf node with its parent node corresponding to the hash of the component.

In the example of FIG. 1, block 104b records transactions 124a-d. Each of the leaf nodes 128a-d contain a hash corresponding to transactions 124a-d respectively. As described above, a hash (e.g., the hash 128a in leaf node) can be a hash of components of a transaction (e.g., transaction 124a), for example, a reference that identifies an output of a prior transaction that is input to the transaction 124a, an attachment, and a command. Each of the non-leaf nodes 132a, 132b can contain a hash of the hashes of its child nodes (e.g., leaf nodes 12ba-b). In this example, node 132a can contain a hash of the hashes contained in 128a, 128b and node 132b can contain a hash of the hashes contained in 128c, 128d. The root node 116b can contain a hash of the hashes of child nodes 132a-b.

A Merkle tree representation of a transaction (e.g., 124a) allows an entity needing access to the transaction 124a to be provided with only a portion that includes the components that the entity needs. For example, if an entity needs only the transaction summary, the entity can be provided with the nodes (and each node's sibling nodes) along the path from the root node to the node of the hash of the transaction summary. The entity can confirm that the transaction summary is that used in the transaction 124a by generating a hash of the transaction summary and calculating the hashes of the nodes along the path to the root node. If the calculated hash of the root node matches the hash 128a of the transaction 124a, the transaction summary is confirmed as the one used in the transaction. Because only the portion of the Merkle tree relating to components that an entity needs is provided, the entity will not have access to other components. Thus, the confidentiality of the other components is not compromised.

In some examples, the blockchain 104 is a bitcoin system developed to allow digital assets such as electronic cash to be transferred directly from one party to another without going through a central authority, such as a financial institution (e.g., as described in the white paper entitled "Bitcoin: A Peer-to-Peer Electronic Cash System" by Satoshi Nakamoto). A bitcoin (an electronic coin) can be represented by a chain of transactions that transfers ownership from one party to another party.

To transfer ownership of a digital asset, such as a bitcoin, using the blockchain 104, a new transaction, such as one of transactions 124*a-d*, is generated and added to a stack of transactions in a block (e.g., block 104*b*). To record a transaction in a blockchain, each party and an asset involved with the transaction needs an account that is identified by a digital token. For example, when a first user wants to transfer an asset that the first user owns to a second user, the first and second user both create accounts, and the first user also creates an account that is uniquely identified by the asset's identification number. The account for the asset identifies the first user as being the current owner of the asset. The first user (e.g., the current owner) creates a transaction (e.g., 124*a*) against the account for the asset that indicates that the transaction 124*a* is a transfer of ownership and outputs a token identifying the second user as the next owner and a token identifying the asset. The transaction 124*a* is signed by the private key of the first user (i.e., the current owner), and the transaction 124*a* is evidence that the second user is now the new current owner and that ownership has been transferred from the first to the second user.

The new transaction 124*a*, which includes the public key of the new owner (e.g., a second user to whom a digital asset is assigned ownership in the transaction), is digitally signed by the first user with the first user's private key to transfer ownership to the second user (e.g., new owner), as represented by the second user public key. The signing by the owner of the bitcoin is an authorization by the owner to transfer ownership of the bitcoin to the new owner via the new transaction 124*a*. Once the block is full, the block is "capped" with a block header, that is, a hash digest of all the transaction identifiers within the block. The block header is recorded as the first transaction in the next block in the chain, creating a mathematical hierarchy called the "blockchain." To verify the current owner, the blockchain 104 of transactions can be followed to verify each transaction from the first transaction to the last transaction. The new owner need only have the private key that matches the public key of the transaction that transferred the bitcoin. The blockchain creates a mathematical proof of ownership in an entity represented by a security identity (e.g., a public key), which in the case of the bitcoin system is pseudo-anonymous.

Additionally, the blockchain 104 can use one or more smart contracts to enable more complex transactions. A smart contract includes computer code implementing transactions of a contract. The computer code can be executed on a secure platform (e.g., an Ethereum platform, which provides a virtual machine) that supports recording transactions (e.g., 124*a-d*) in blockchains. For example, a smart contract can be a self-executing contract with the terms of the agreement between buyer and seller being directly written into lines of code. The code and the agreements contained therein exist across a distributed, decentralized blockchain network.

In addition, the smart contract can itself be recorded as a transaction 124*a* in the blockchain 104 using a token that is a hash 128*a* of the computer code so that the computer code that is executed can be authenticated. When deployed, a constructor of the smart contract executes, initializing the smart contract and its state. The state of a smart contract is stored persistently in the blockchain 104. When a transaction 124*a* is recorded against a smart contract, a message is sent to the smart contract, and the computer code of the smart contract executes to implement the transaction (e.g., debit a certain amount from the balance of an account). The computer code ensures that all the terms of the contract are complied with before the transaction 124*a* is recorded in the blockchain 104.

For example, a smart contract can support the sale of an asset. The inputs to a smart contract to sell an asset can be tokens identifying the seller, the buyer, the asset, and the sale price in U.S. dollars or cryptocurrency. The computer code is used to ensure that the seller is the current owner of the asset and that the buyer has sufficient funds in their account. The computer code records a transaction (e.g., 124*a*) that transfers the ownership of the asset to the buyer and a transaction (e.g., 124*b*) that transfers the sale price from the buyer's account to the seller's account. If the seller's account is in U.S. dollars and the buyer's account is in Canadian dollars, the computer code can retrieve a currency exchange rate, determine how many Canadian dollars the seller's account should be debited, and record the exchange rate. If either transaction 124*a* or 124*b* is not successful, neither transaction is recorded.

When a message is sent to a smart contract to record a transaction 124*a*, the message is sent to each node that maintains a replica of the blockchain 104. Each node executes the computer code of the smart contract to implement the transaction 124*a*. For example, if a hundred nodes each maintain a replica of the blockchain 104, the computer code executes at each of the hundred nodes. When a node completes execution of the computer code, the result of the transaction 124*a* is recorded in the blockchain 104. The nodes employ a consensus algorithm to decide which transactions (e.g., 124*c*) to keep and which transactions (e.g., 124*d*) to discard. Although the execution of the computer code at each node helps ensure the authenticity of the blockchain 104, large amounts of computer resources are required to support such redundant execution of computer code.

Although blockchains can effectively store transactions 124*a-d*, the large amount of computer resources, such as storage and computational power, needed to maintain all the replicas of the blockchain can be problematic. To overcome this problem, some systems for storing transactions 124*a-d* do not use blockchains, but rather have each party to a transaction maintain its own copy of the transaction 124*a*. One such system is the Corda™ system developed by R3™ that provides a decentralized distributed ledger platform in which each participant in the platform has a node (e.g., computer system) that maintains its portion of the distributed ledger.

When parties agree on the terms of a transaction 124*a*, a party submits the transaction 124*a* to a notary, which is a trusted node, for notarization. The notary maintains a consumed output database of transaction outputs that have been input into other transactions. When a transaction 124*a* is received, the notary checks the inputs to the transaction 124*a* against the consumed output database to ensure that the outputs that the inputs reference have not been spent. If the inputs have not been spent, the notary updates the consumed output database to indicate that the referenced outputs have been spent, notarizes the transaction 124*a* (e.g., by signing the transaction or a transaction identifier with a private key of the notary), and sends the notarized transaction to the party that submitted the transaction 124a for notarization. When the party receives the notarized transaction, the party stores the notarized transaction and provides the notarized transaction to the counterparties.

In some embodiments, a notary is a non-validating notary or a validating notary. When a non-validating notary is to notarize a transaction (e.g., 124b), the non-validating notary determines that the prior output of a prior transaction (e.g., 124a); that is, the input of the current transaction 124b, has not been consumed. If the prior output has not been consumed, the non-validating notary notarizes the transaction 124b by signing a hash 128b of the transaction. To notarize a transaction 124b, a non-validating notary needs only the identification of the prior output (e.g., the hash 128a of the prior transaction 124a and the index of the output) and the portion of the Merkle tree needed to calculate the hash 128b of the transaction 124b.

In some embodiments, the blockchain 104 uses one or more smart contracts to enable more complex transactions. For example, a validating notary validates a transaction (e.g., 124d), which includes verifying that prior transactions 124a-c in a backchain of transactions are valid. The backchain refers to the collection of prior transactions (e.g., 124c) of a transaction 124d, as well as prior transactions 124a-b of those prior transactions 124c, and so on. To validate a transaction 124d, a validating notary invokes validation code of the transaction 124d. In one example, a validating notary invokes validation code of a smart contract of the transaction 124d. The validation code performs whatever checks are needed to comply with the terms applicable to the transaction 124d. This checking may include retrieving the public key of the owner from the prior transaction 124c (pointed to by the input state of the transaction 124d) and checks the signature of the transaction 124d, ensuring that the prior output of a prior transaction that is input has not been consumed, and checking the validity of each transaction (e.g., 124c) in the backchain of the transactions. If the validation code indicates that the transaction 124d is valid, the validating notary notarizes the transaction 124d and records the output of the prior transaction 124c as consumed.

In some examples, to verify that the transactions 124a-d in a ledger stored at a node are correct, the blocks 104a-c in the blockchain 104 can be accessed from oldest 104a to newest 104c, generating a new hash of the block 104c and comparing the new hash to the hash 108c, which is generated when the block 104c was created. If the hashes are the same, then the transactions in the block are verified. In one example, the Bitcoin system also implements techniques to ensure that it would be infeasible to change a transaction 124a and regenerate the blockchain 104 by employing a computationally expensive technique to generate a nonce 120b that is added to the block when it is created. A bitcoin ledger is sometimes referred to as an Unspent Transaction Output ("UTXO") set because it tracks the output of all transactions that have not yet been spent.

Figure 2:
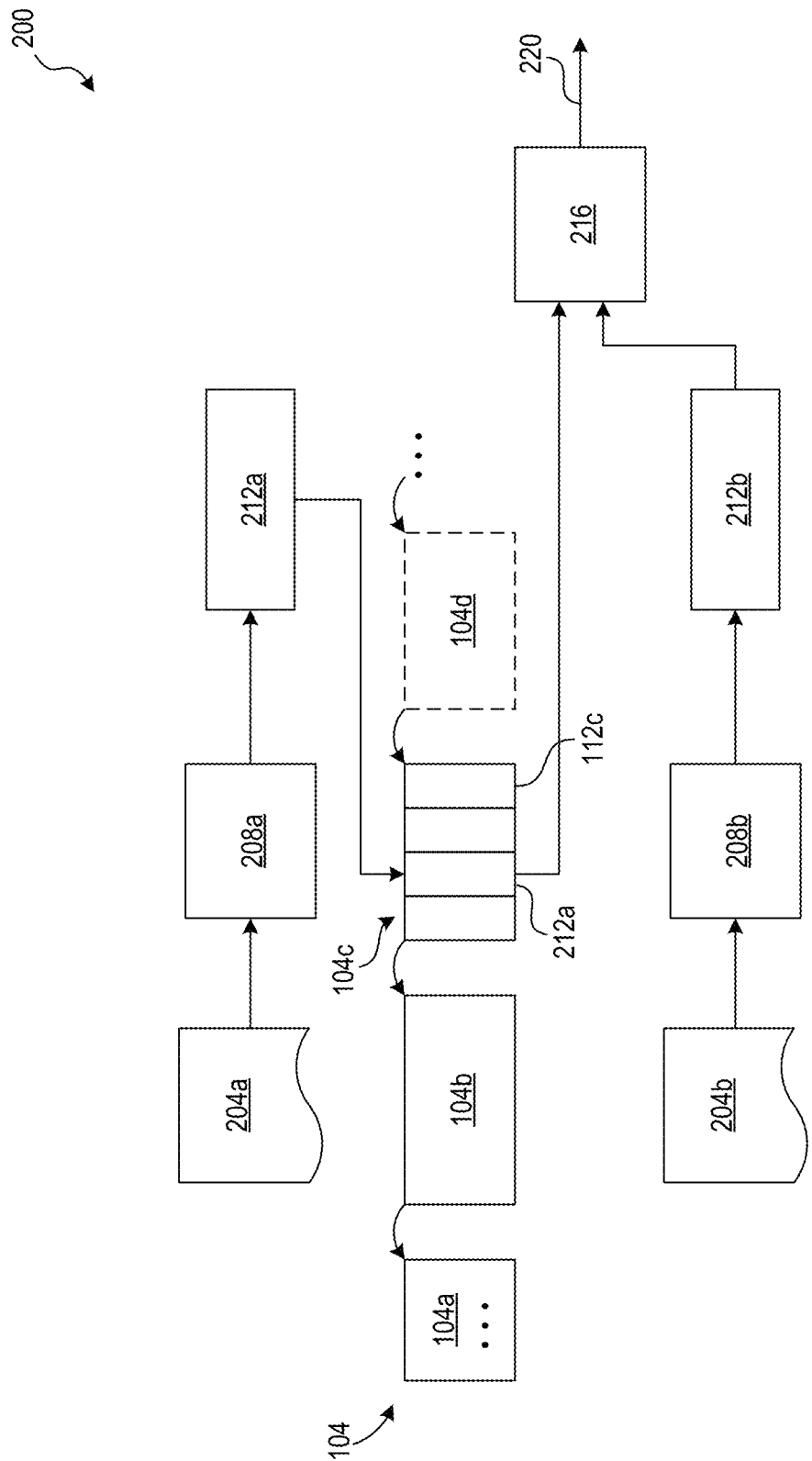
FIG. 2 is a drawing illustrating an example hash algorithm.

FIG. 2 illustrates a process 200 that uses a hash algorithm to generate a type of digital asset referred to as a non-fungible token (NFT) or to perform a cryptographic transaction on a blockchain. A blockchain 104, e.g., as shown in FIG. 2, is also illustrated and described in detail with reference to FIG. 1. The process 200 can be performed by a computer system such as that described with reference to FIG. 7 and/or by nodes of the blockchain 104. Some embodiments include different and/or additional steps or perform steps in different orders.

In embodiments, a digital asset such as a message, electronic art, a digital collectible, any other form of digital content, or a combination thereof 204a may be hashed using hashing algorithm 208a. The hashing algorithm 208a (sometimes referred to as a "hash function") may be a function used to map data of arbitrary size (e.g., content 204a) to fixed-size values (e.g., hash values 212a). The hash values 212a that are returned by the hash function 208a can be called hash values, hash codes, digests, or hashes. The hash values 212a can be used to index a fixed-size table called a hash table. A hash table, also known as a hash map, is a data structure that implements an associative array or dictionary, which is an abstract data type that maps keys (e.g., content 204a) to hash value 212a.

The output of the hashed content 204a (e.g., hash value 212a) can be inserted into a block (e.g., block 104c) of the blockchain 104 (e.g., comprising blocks such as blocks 104a-d). The block 104c can include, among other things, information such as timestamp 112c. In order to verify that the block 104c is correct, a new hash 212b is generated by applying hashing algorithm 208b to the digital content 204b. The new hash 212b is compared to the hash values 212a in the blockchain 104 at comparison step 216. If the new hash 212b is the same as the hash values 212a of the block 104c, the comparison yields an indication that they match. For example, the decision 220 can indicate that the hashes values 212a-b are the same or different. The hashes can be indicated to be the same if the characters of the hash match. The hashing algorithms 208a-b can include any suitable hashing algorithm. Examples include Message Digest 5 (MD5), Secure Hashing Algorithm (SHA) and/or the likes.

Components of the process 200 can generate or validate an NFT, which is a digital asset that has a unique identification code and metadata that uniquely identifies the NFT. In one example, the digital content 204a can be hashed and minted to generate an NFT, or the content 204a can represent an NFT that is verified using the process 200 and the content 204b. An NFT can include digital data stored in the blockchain 104. The ownership of an NFT is recorded in the blockchain 104 and transferrable by an owner, allowing the NFT to be sold and traded. The NFT (e.g., 212a) contains a reference to digital files such as photos, videos, or audio (e.g., content 204a). Because NFTs are uniquely identifiable assets, they differ from cryptocurrencies, which are fungible. In particular, NFTs function like cryptographic tokens, but unlike cryptocurrencies such as Bitcoin or Ethereum™, NFTs are not mutually interchangeable, and so are not fungible.

The NFT can be associated with a particular digital or physical asset such as images, art, music, and sport highlights (e.g., content in blocks 104a) and can confer licensing rights to use the asset in a particular block 104a for a specified purpose. As with other assets, NFTs are recorded on a blockchain when a blockchain 104 concatenates records containing cryptographic hashes—sets of characters that identify a set of data—onto previous records, creating a chain of identifiable data blocks 104a-d. A cryptographic transaction process enables authentication of each digital file by providing a digital signature that tracks NFT ownership. In embodiments, a data link that is part of the NFT records points to details about where the associated art (content in blocks 104a) is stored.

Minting an NFT (e.g., 212a) may refer to the process of turning a digital file (e.g., 204a) into a crypto collectible or digital asset on blockchain 104 (e.g., the Ethereum™ blockchain). The digital item or file (e.g., content 204a) may be stored in the blockchain 104 and may not be able to be edited, modified, or deleted. The process of uploading a specific item onto the blockchain 104 is known as "minting." For example, "NFT minting" can refer to a process by which a digital art or digital content 204a becomes a part of the Ethereum™ blockchain. Thus, the process turns digital content 204a into a digital asset (e.g., 212a), which is easily traded or bought with cryptocurrencies on a digital marketplace without an intermediary.

Figure 3:
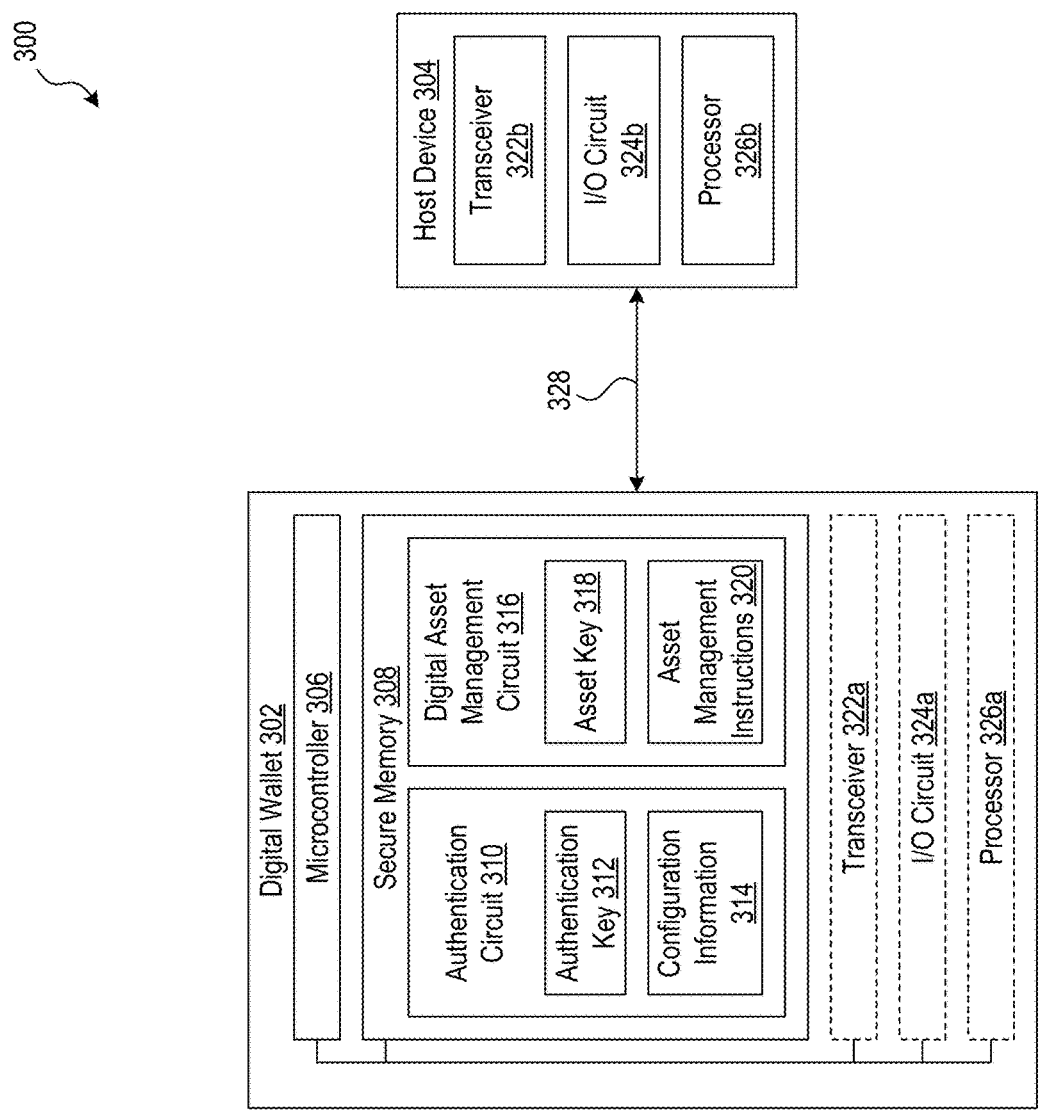
FIG. 3 is a block diagram illustrating an example digital wallet.

FIG. 3 is a block diagram 300 illustrating an example digital wallet device. In particular, a digital wallet 302 is an electronic entity that allows users to securely manage digital assets. According to various embodiments, the digital wallet 302 can be a hardware-based wallet (e.g., can include dedicated hardware component(s)), a software-based wallet, or a combination thereof. Example digital assets that can be stored and managed using the digital wallet 302 include digital coins, digital tokens, and/or the like. In some embodiments, tokens are stored on a blockchain system, such as the blockchain system 100 described in FIG. 1. In some embodiments, the digital wallet 302 may be capable of connecting to and managing digital assets that are native to or associated with different blockchain systems 100.

As defined herein, the terms "coin" and "token" refer to a digital representation of a particular asset, utility, ownership interest, and/or access right. Any suitable type of coin or token can be managed using various embodiments of the digital wallet 302. In some embodiments, tokens include cryptocurrency, such as exchange tokens and/or stablecoins. Exchange tokens and/or stablecoins can be native to a particular blockchain system 100 and, in some instances, can be backed by a value-stable asset, such as fiat currency, precious metal, oil, or another commodity. In some embodiments, tokens are utility tokens that provide access to a product or service rendered by an operator of the blockchain system 100 (e.g., a token issuer). In some embodiments, tokens are security tokens, which can be securitized cryptocurrencies that derive from a particular asset, such as bonds, stocks, real estate, and/or fiat currency, or a combination thereof, and can represent an ownership right in an asset or in a combination of assets.

In some embodiments, tokens are NFTs or other non-fungible digital certificates of ownership, or decentralized finance (DeFi) tokens. DeFi tokens can be used to access feature sets of DeFi software applications (dApps) built on the blockchain system 100. Example dApps can include decentralized lending applications (e.g., Aave), decentralized cryptocurrency exchanges (e.g., Uniswap), decentralized NFT marketplaces (e.g., OpenSea, Rarible), decentralized gaming platforms (e.g., Upland), decentralized social media platforms (e.g., Steemit), decentralized music streaming platforms (e.g., Audius), and/or the like. In some embodiments, tokens provide access rights to various computing systems and can include authorization keys, authentication keys, passwords, PINs, biometric information, access keys, and other similar information. The computing systems to which the tokens provide access can be both on-chain (e.g., implemented as dApps on a particular blockchain system 100) or off-chain (e.g., implemented as computer software on computing devices that are separate from the blockchain system 100).

The digital wallet 302 of FIG. 3 can be embodied in a device that is communicatively coupled to the host device 304 (e.g., a mobile phone, a laptop, a tablet, a desktop computer, a wearable device, a point-of-sale (POS) terminal, an automated teller machine (ATM) and the like) via the communication link 328. In some embodiments, the host device 304 can extend the feature set available to the user of the digital wallet 302 when it is coupled to the host device 304. For instance, the host device may provide the user with the ability to perform balance inquiries, convert tokens, access exchanges and/or marketplaces, perform transactions, access computing systems, and/or the like.

In some embodiments, the digital wallet 302 and the host device 304 can be owned and/or operated by the same entity, user, or a group of users. For example, an individual owner of the digital wallet 302 can also operate a personal computing device that acts as a host device 304 and provides enhanced user experience relative to the digital wallet 302 (e.g., by providing a user interface that includes graphical features, immersive reality experience, virtual reality experience, or similar). In some embodiments, the digital wallet 302 and the host device 304 can be owned and/or operated by different entities, users and/or groups of users. For example, the host device 304 can be a point-of-sale (POS) terminal at a merchant location, and the individual owner of the digital wallet 302 can use the digital wallet 302 as a method of payment for goods or services at the merchant location by communicatively coupling the two devices for a short period of time (e.g., via chip, via near-field communications (NFC), by scanning of a bar code, by causing the digital wallet 302 to generate and display a quick response (QR) code) to transmit payment information from the digital wallet 302 to the host device 304.

The digital wallet 302 and the host device 304 can be physically separate and/or capable of being removably coupled. The ability to physically and communicatively uncouple the digital wallet 302 from the host device 304 and other devices enables the air-gapped digital wallet 302 to act as "cold" storage, where the stored digital assets are moved offline and become inaccessible to the host device 304 and other devices. Further, the ability to physically and communicatively uncouple the digital wallet 302 from the host device 304 allows the digital wallet 302 to be implemented as a larger block of physical memory, which extends the storage capacity of the digital wallet 302, similar to a safety deposit box or vault at a brick-and-mortar facility.

Accordingly, in some embodiments, the digital wallet 302 and the host device 304 are physically separate entities. In such embodiments, the communications link 328 can include a computer network. For instance, the digital wallet 302 and the host device 304 can be paired wirelessly via a short-range communications protocol (e.g., Bluetooth, ZigBee, infrared communication) or via another suitable network infrastructure. In some embodiments, the digital wallet 302 and the host device 304 are removably coupled. For instance, the host device 304 can include a physical port, outlet, opening, or similar to receive and communicatively couple to the digital wallet 302, directly or via a connector.

In some embodiments, the digital wallet 302 can include or be stored on a tangible storage media, such as a dynamic random-access memory (DRAM) stick, a memory card, a secure digital (SD) card, a flash drive, a solid state drive (SSD), a magnetic hard disk drive (HDD), or an optical disc, and/or the like and can connect to the host device via a suitable interface, such as a memory card reader, a USB port, a micro-USB port, an eSATA port, and/or the like.

In some embodiments, the digital wallet 302 can include or be stored on an integrated circuit, such as a SIM card, a smart cart, and/or the like. For instance, in some embodiments, the digital wallet 302 can be a physical smart card that includes an integrated circuit, such as a chip that can store data. In some embodiments, the digital wallet 302 is a contactless physical smart card. Advantageously, such embodiments enable data from the card to be read by a host device as a series of application protocol data units (APDUs) according to a conventional data transfer protocol between payment cards and readers (e.g., ISO/IEC 7816), which enhances interoperability between the cryptographic payment ecosystem and payment card terminals.

In some embodiments, the digital wallet 302 and the host device 304 are non-removably coupled. For instance, various components of the digital wallet 302 can be co-located with components of the host device 304 in the housing of the host device 304. In such embodiments, the host device 304 can be a mobile device, such as a phone, a wearable, or similar, and the digital wallet 302 can be built into the host device. The integration between the digital wallet 302 and the host device 304 can enable improved user experience and extend the feature set of the digital wallet 302 while preserving computing resources (e.g., by sharing the computing resources, such as transceiver, processor, and/or display or the host device 304). The integration further enables the ease of asset transfer between parties. The integration can further enhance loss protection options, as recovering a password or similar authentication information, rather than recovering a physical device, can be sufficient to restore access to digital assets stored in the digital wallet 302. In some embodiments, the non-removably coupled digital wallet 302 can be air-gapped by, for example, disconnecting the host device 304 from the Internet.

As shown, the digital wallet 302 can include a microcontroller 306. The microcontroller 306 can include or be communicatively coupled to (e.g., via a bus or similar communication pathway) at least a secure memory 308. The digital wallet 302 can further include a transceiver 322a, and input/output circuit 324a, and/or a processor 326a. In some embodiments, however, some or all of these components can be omitted.

In some embodiments, the digital wallet 302 can include a transceiver 322a and therefore can be capable of independently connecting to a network and exchanging electronic messages with other computing devices. In some embodiments, the digital wallet 302 does not include a transceiver 322a. The digital wallet 302 can be capable of connecting to or being accessible from a network, via the transceiver 322b of the host device 304, when the digital wallet 302 is docked to the host device 304. For example, in some embodiments, the user of the digital wallet 302 can participate in token exchange activities on decentralized exchanges when the digital wallet 302 is connected to the host device 304.

In some embodiments, the digital wallet 302 can include an input/output circuit 324a, which may include user-interactive controls, such as buttons, sliders, gesture-responsive controls, and/or the like. The user-interactive controls can allow a user of the digital wallet 302 to interact with the digital wallet 302 (e.g., perform balance inquiries, convert tokens, access exchanges and/or marketplaces, perform transactions, access computing systems, and/or the like). In some embodiments, the user can access an expanded feature set, via the input/output circuit 324b of the host device 304, when the digital wallet 302 is docked to the host device 304. For example, host device 304 can include computer-executable code structured to securely access data from the digital wallet 302 of the digital wallet 302 and to perform operations using the data. The data can include authentication information, configuration information, asset keys, and/or token management instructions. The data can be used by an application that executes on or by the host device 304. The data can be used to construct application programming interface (API) calls to other applications that require or use the data provided by digital wallet 302. Other applications can include any on-chain or off-chain computer applications, such as dApps (e.g., decentralized lending applications, decentralized cryptocurrency exchanges, decentralized NFT marketplaces, decentralized gaming platforms, decentralized social media platforms, decentralized music streaming platforms), third-party computing systems (e.g., financial institution computing systems, social networking sites, gaming systems, online marketplaces), and/or the like.

The secure memory 308 is shown to include an authentication circuit 310 and a digital asset management circuit 316. The authentication circuit 310 and/or digital asset management circuit 316 include computer-executable code that, when executed by one or more processors, such as one or more processors 326a and/or 326b, performs specialized computer-executable operations. For example, the authentication circuit 310 can be structured to cause the digital wallet 302 to establish, maintain and manage a secure electronic connection with another computing device, such as the host device 304. The digital asset management circuit 316 can be structured to cause the digital wallet 302 to allow a user to manage the digital assets accessible via the digital wallet 302. In some embodiments, the authentication circuit 310 and the digital asset management circuit 316 are combined in whole or in part.

As shown, the authentication circuit 310 can include retrievably stored security, authentication, and/or authorization data, such as the authentication key 312. The authentication key 312 can be a numerical, alphabetic, or alphanumeric value or combination of values. The authentication key 312 can serve as a security token that enables access to one or more computing systems, such as the host device 304. For instance, in some embodiments, when the digital wallet 302 is paired or docked to (e.g., establishes an electronic connection with) the host device 304, the user may be prompted to enter authentication information via the input output circuit(s) 324a and/or 322b. The authentication information may include a PIN, a password, a pass phrase, biometric information (e.g., fingerprint, a set of facial features, a retinal scan), a voice command, and/or the like. The authentication circuit 310 can compare the user-entered information to the authentication key 312 and maintain the electronic connection if the items match at least in part.

As shown, the authentication circuit 310 can include retrievably stored configuration information 314. The configuration information 314 can include a numerical, alphabetic, or alphanumeric value or combination of values. These items can be used to enable enhanced authentication protocols. For instance, the configuration information 314 can include a timeout value for an authorized connection between the digital wallet 302 and the host device 304. The configuration information 314 can also include computer-executable code. In some embodiments, for example, where a particular digital wallet 302 is set up to pair with only one or a small number of pre-authorized host devices 304, the configuration information 314 can include a device identifier and/or other device authentication information, and the computer-executable code may be structured to verify the device identifier and/or other device authentication information against the information associated with or provided by the host device 304. When a pairing is attempted, the computer-executable code may initiate or cause the host device 304 to initiate an electronic communication (e.g., an email message, a text message) using user contact information stored as configuration information 314.

As shown, the digital asset management circuit 316 can include retrievably stored digital asset data, such as the asset key 318. The asset key 318 can be a numerical, alphabetic, or alphanumeric value or combination of values. In some embodiments, the asset key 318 is a private key in a public/private key pair, a portion thereof, or an item from which the private key can be derived. Accordingly, the asset key 318 proves ownership of a particular digital asset stored on a blockchain system 100. The asset key 318 can allow a user to perform blockchain transactions involving the digital asset. The blockchain transactions can include computer-based operations to earn, lend, borrow, long/short, earn interest, save, buy insurance, invest in securities, invest in stocks, invest in funds, send and receive monetary value, trade value on decentralized exchanges, invest and buy assets, sell assets, and/or the like. The digital wallet 302 can be identified as a party to a blockchain transaction on the blockchain system 100 using a unique cryptographically generated address (e.g., the public key in the public/private key pair).

As shown, the digital asset management circuit 316 can also include retrievably stored asset management instructions 320. The asset management instructions 320 can include a numerical, alphabetic, or alphanumeric value or combination of values. These items can be used to enable computer-based operations related to managing digital assets identified by the asset keys 318. For instance, the asset management instructions 320 can include parameter values, metadata, and/or similar values associated with various tokens identified by the asset keys 318 and/or by the blockchain systems 100 associated with particular tokens. The asset management instructions 320 can also include computer-executable code. In some embodiments, for example, asset management functionality (e.g., balance inquiry and the like) can be executable directly from the digital wallet 302 rather than or in addition to being executable from the host device 304.

Figure 4B:
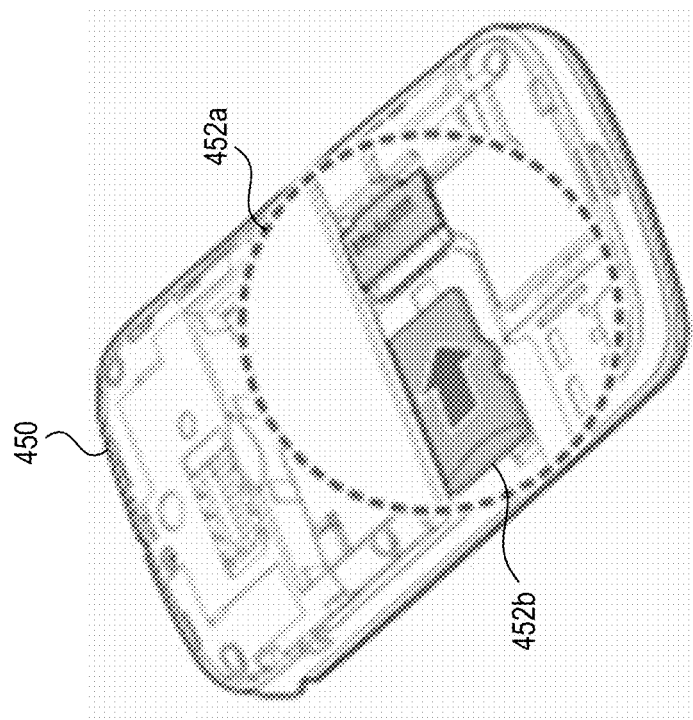
FIG. 4B is a drawing illustrating another example host device for the apparatus for securely managing access to digital assets.
Figure 4A:
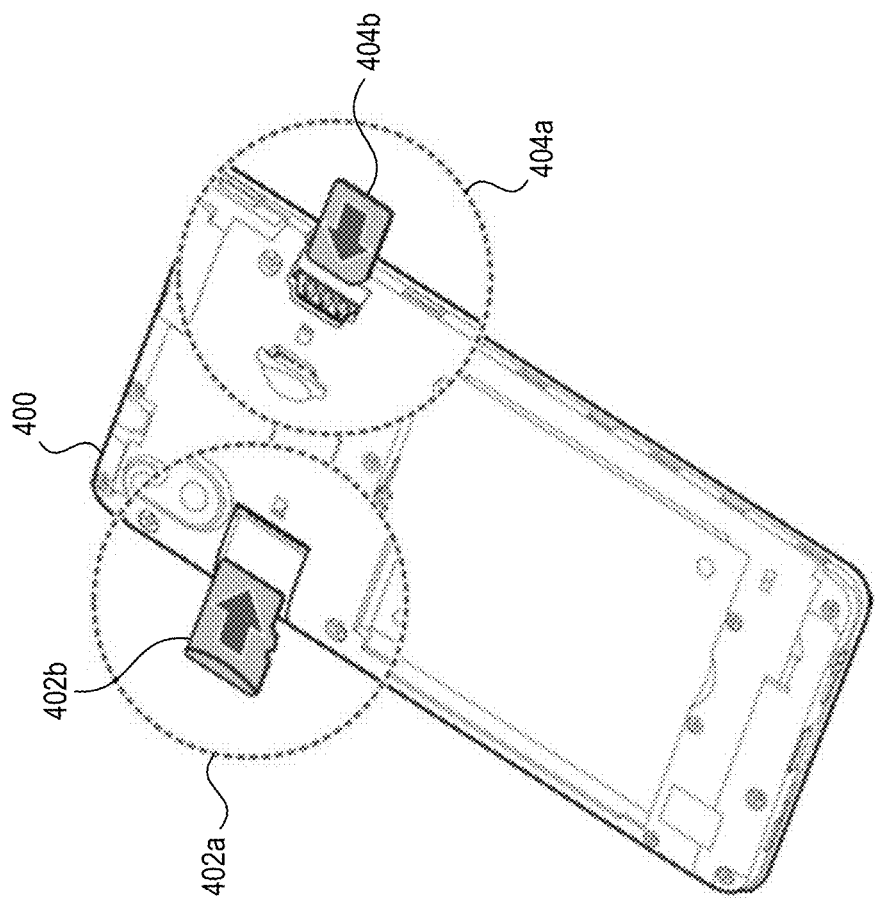
FIG. 4A is a drawing illustrating an example host device for an apparatus for securely managing access to digital assets.

FIG. 4A illustrates an example of a host device 400 configured to receive a removable apparatus configured to securely store a digital wallet and/or digital assets. FIG. 4B illustrates another example of a host device 450 configured to receive a removable apparatus configured to securely store a digital wallet and/or digital assets. As shown, the removable apparatus includes portable memory devices 402b, 404b, or 452b that are configured to securely store digital wallets and/or assets. Each removable apparatus is implemented as an expandable memory unit, and integrated circuit, or the like. For instance, the apparatus 402b, 404b, or 452b can include a flash memory card, such as a secured digital (SD) card, an SD High-Capacity card, an SD Extended Capacity (SDXC) card, an SD Ultra Capacity (SDUC) card, a Compact Flash (CF) card, a MicroDrive (MD) card, a universal serial bus (USB) drive, and/or the like. The host device 400 or 450 can be a mobile device, such as a smartphone, a tablet, a laptop, and/or the like. The host device can include one or more wired openings 402a, 404a, and/or 452a structured to receive and communicatively pair with the apparatus 402b, 404b, or 452b.

Figure 5:
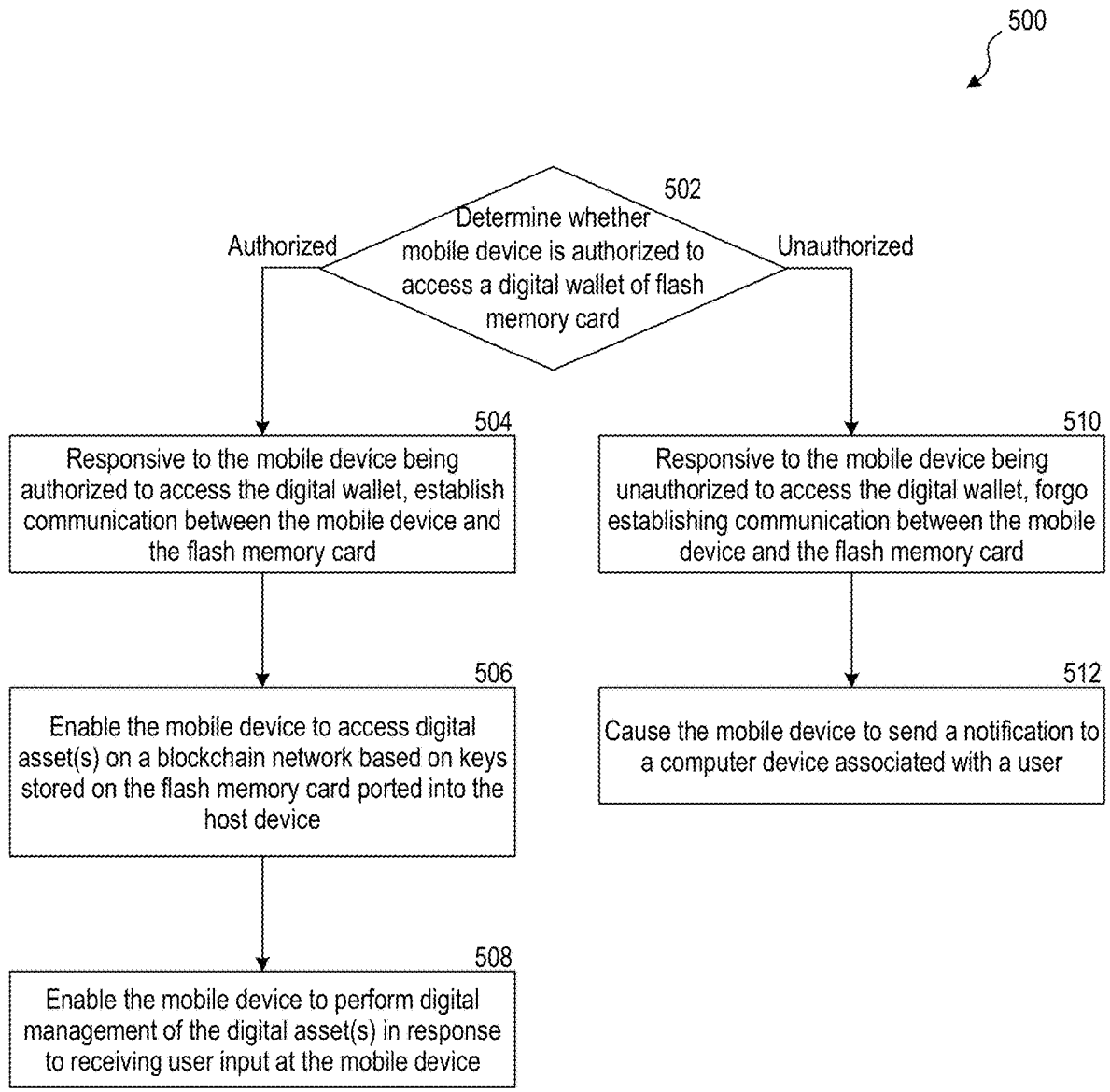
FIG. 5 is a flowchart that illustrates processes for securely managing access to digital assets.

FIG. 5 is a flowchart that illustrates processes 500 for securely managing access to digital assets. The processes 500 can be performed by a system including a host device and a memory device hosted by the host device. Examples of the host device include a handheld mobile device, smart device, tablet computer, laptop, desktop, or any other computing device capable of storing and/or communicating data. In some embodiments, the memory device stores a digital wallet, where the memory device is communicatively coupled to and removable from a host device. In some embodiments, one or more computer-readable storage media excluding transitory signals can carry instructions that, when executed by at least one data processor, can cause performance of the processes 500.

At 502, a mobile device that functions as a host device detects a portable memory device (e.g., storing a digital wallet) docked into and communicatively coupled to the mobile device. For example, the digital wallet can be stored in a flash memory card or another non-volatile memory medium, and circuitry on the mobile device can recognize that the flash memory card has been inserted into a memory card slot or a similar port on the mobile device.

In response to detecting that the portable memory device has been docked into a port of the host device, computer-executable instructions stored at the memory device and/or host devices can determine whether the host device is authorized to access the digital wallet stored on the memory device. For example, the host device can prompt a user to provide authentication information via the host device. In another example, the two devices are authorized to communicate with each other by validating a password. Examples include a cryptographic password, such as a key in a public/private key pair generated by/for the digital wallet. In some embodiments, computer-executable code stored in the memory device can determine whether a data value provided by the host device matches or sufficiently matches (e.g., greater than a threshold amount) pre-stored authentication information, configuration information, and/or the like. Accordingly, by using the authentication information provided by or via the host device, the digital wallet can enforce a one-to-one pairing or a set of predetermined one-to-one pairings between the digital wallet and one or more predetermined host devices. For instance, a user can perform wallet-to-device initialization operations to establish a new pairing and designate a particular device for use with the digital wallet.

Examples of authentication information include a PIN code, a password, a previously stored token, biometric information captured via a camera associated with the host device, and/or the like. Other examples of authentication information include a device identifier, such as a MAC address, an International Mobile Equipment Identity (IMEI) number, an International Mobile Subscriber Identity (IMSI) number, an Integrated Circuit Card Identifier (ICCID), s Subscriber Identity Module (SIM) identifier, an eSIM identifier, a unique equipment identifier associated with a transceiver on the host device (e.g., antenna, Bluetooth module), or another similar hardware, integrated circuit, or digital identify identification feature. In another example, a previously stored authentication token or value may be provided as authentication information.

In some embodiments, initialization operations can include, for example, generating authentication and/or configuration information that uniquely identifies the host device (e.g., generating an authentication key) and retrievably storing the authentication and/or configuration information in memory of the digital wallet. In some embodiments, initialization operations can include generating an encryption key using the host device, using the key to encrypt items stored in memory of the digital wallet, and storing a first copy of the key as authentication information. In such embodiments, the encrypted items may be encrypted using a second copy of the key received from a paired device during a subsequent authentication process.

The initialization operations to establish a new pairing and designate a particular host device for use with the digital wallet can include, for example, generating a encryption key/by or for the digital wallet and providing the encryption key to the host device. In such embodiments, the generated encryption key can be used to further secure digital assets upon detecting an unsuccessful pairing attempt. For example, if it is determined, by the memory device storing the digital wallet, that a particular host device is not authorized to pair with the memory device, the memory device can execute a security step-up protocol. In some instances, a security step-up protocol can include encrypting asset key(s) stored in the digital wallet using the previously generated encryption key. In some instances, the security step-up protocol can include making the asset key(s) inaccessible for a predetermined period of time defined by configuration settings previously stored in the memory of the digital wallet (e.g., freezing the associated digital assets). In such instances, a user may be authorized to use a particular mobile device with the digital wallet only when a specific SIM card is used in the mobile device. In some instances, the security step-up protocol may include operations to initiate or cause the host device to initiate an electronic communication using user contact information stored as configuration information. In such instances, a shared mobile device can be used by different users to access a single digital wallet (e.g., in a family setting, in a financial institution, and/or the like), and additional notification-based authentication operations may be performed to authenticate a particular user in addition to authenticating a particular host device.

Responsive to determining that the host device is authorized to communicate with the digital wallet, certain operations, such as 504, 506, and/or 508, are performed. At 504, the memory device and the host device are communicatively coupled, allowing the devices to exchange data and computer-executable instructions. At 506, the digital wallet is caused to provide one or more cryptographic key(s) to the host device. The host device can access one or more blocks on a blockchain (e.g., blockchain 104) with the cryptographic key(s). The block(s) can store digital assets (e.g., cryptographic assets, coins, tokens, NFTs) and are referenced by the device key(s). In some embodiments, a particular cryptographic key corresponds to a portion of an access identifier (e.g., a private key) that enables access to the digital asset. In such embodiments, the cryptographic key can enable derivation of a complete authentication unit (e.g., a seed phrase) as described in reference to an example embodiment of FIG. 6.

At 516, the host device is enabled to perform digital management of the cryptographic assets. For instance, an application executing on or otherwise provided to a host device (e.g., as a previously installed mobile application, as an online application accessible via a browser) can establish a connection with the digital wallet, receive data (e.g., access key(s), computer-executable instructions) therefrom, and perform blockchain-based transactions using the received data. Accordingly, the host device can provide the user with the ability to perform balance inquiries, convert tokens, access exchanges and/or marketplaces, perform transactions, access computing systems, and/or the like.

Responsive to determining that the host device is not authorized to communicate with the digital wallet, operations 510 and 512 are performed. At 510, the digital wallet is caused to forgo establishing communication with the mobile device. For example, the memory device can disable the exchange of data and/or computer-executable instructions between the digital wallet and the host device, encrypt assets, freezing assets, or the like. At 512, the host device is caused to send a notification to a particular user associated with the digital wallet as indicated by authentication or configuration information stored in the memory device.

Figure 6:
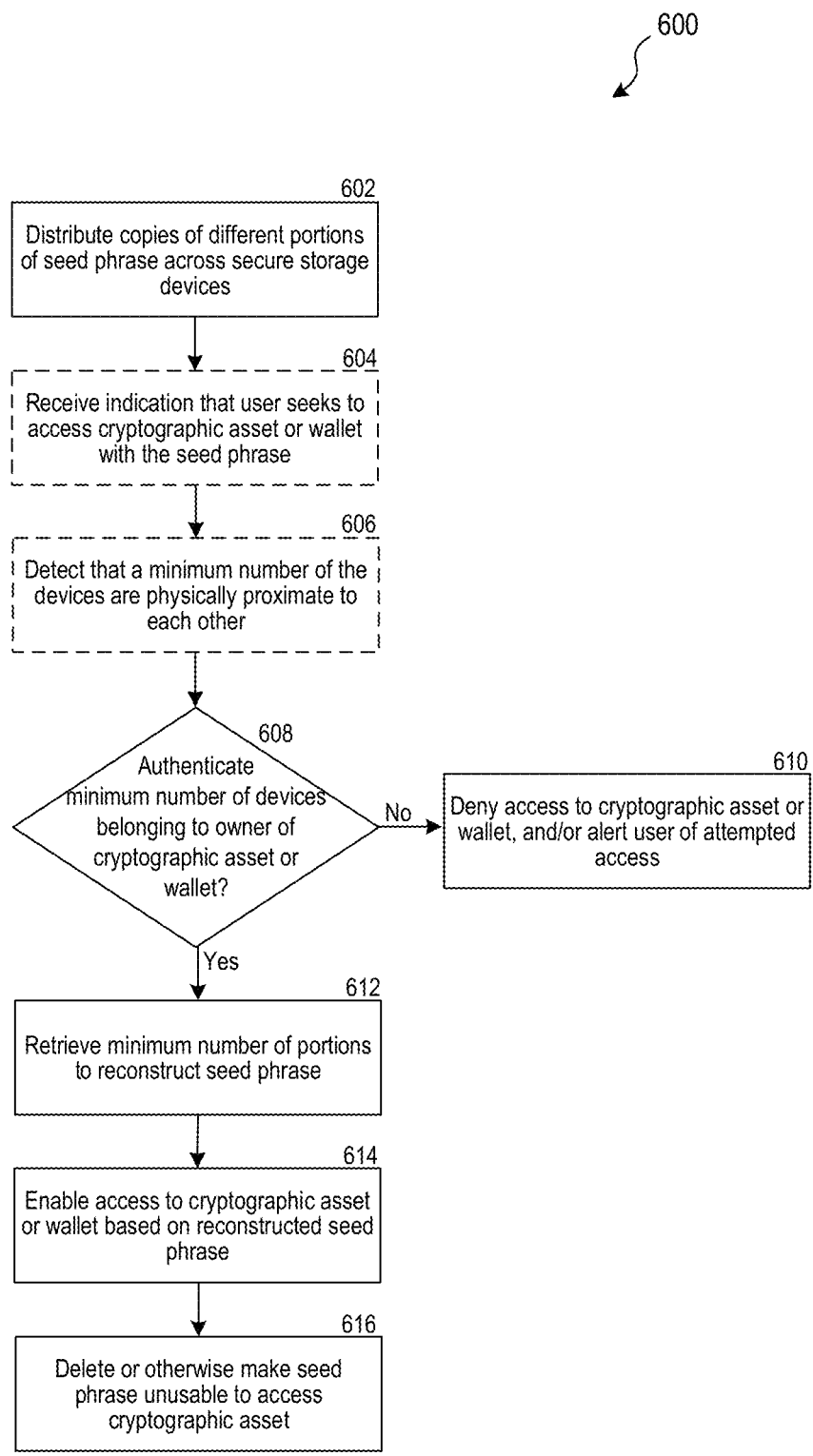
FIG. 6 is a flowchart that illustrates a process for reconstructing a seed phrase that is fragmented across a group of devices including a removable memory device.

FIG. 6 is a flowchart that illustrates a process 600 for reconstructing a seed phrase that is fragmented across a group of devices including a removable memory device. As described in U.S. patent application Ser. No. 17/823,051, incorporated herein in its entirety and for all purposes, a seed phrase can be reconstructed from portions that are distributed across numerous devices. The portions from a minimum set of the devices, less than all the portions from all devices, can be used to assemble the seed phrase, which can be used to access one or more keys stored in a digital wallet to access cryptographic assets. The processes 600 can be performed by a system including a handheld mobile device, smart device, tablet computer, laptop, desktop, or any other computing device capable of storing and communicating data. In some embodiments, the system can include one or more digital wallets embodied in memory devices that are removably coupled to host devices. In some embodiments, one or more computer-readable storage media excluding transitory signals can carry instructions that, when executed by at least one data processor of the system, can cause performance of the processes 600.

At 602, copies of N portions of a seed phrase are distributed across N devices including a memory device storing a digital wallet. That is, the devices can store respective portions of a seed phrase that have been fragmented into those portions. In some embodiments, the seed phrase corresponds to authentication information including an ordered set of terms that are necessary and sufficient to access a digital asset or to access a digital wallet associated with a user or keys stored in the digital wallet. Each of the N portions includes one or more terms or portions thereof. The distributed portions can all be different (e.g., not identical) or some can be the same (e.g., identical). For example, devices can store different portions of the same seed phrase (different terms and/or different order) or devices can store some portions that are the same (e.g., same terms, same order).

There is a minimum number of portions (M) that are necessary and sufficient to reconstruct the seed phrase. As such, M devices, which can include one or more digital wallets, are required to reconstruct the seed phrase from a combination of their M portions of the seed phrase. Thus, the subset M of the set of N devices stores portions of the seed phrase, where M is greater than one but fewer than all N devices. In one optional example, a security level can be set for the seed phrase. The security level is proportional to a number of terms in a portion such that a higher security level corresponds to fewer terms compared to a lower security level. The system can determine the number of terms for the multiple portions based on the security level. In one example, the distributed portions of the seed phrase each have an equal number of terms, which is less than the total number of terms of the seed phrase. The security of the seed phrase increases as the number of devices storing the portions increases and/or the portions have fewer terms. That is, more portions of the seed phrase would be required to reconstruct the seed phrase if the portions have fewer terms.

At 604, a request is received indicating that a requesting device seeks to access a cryptographic asset by using a cryptographic key stored in a digital wallet. For example, an output of the requesting device can indicate that the user seeks to gain access to the cryptographic key or asset. The requesting device can include a host device or a removable memory device that plugs into a receptacle of the host device. Access to the cryptographic key requires the seed phrase as authentication information. For example, a smartphone can act as a host to a removable memory device, which stores the digital wallet. In response to user input on the smartphone, an indication is generated that the smartphone seeks to access a cryptographic key or asset stored on the removable memory device. The seed phrase needs to be reconstructed from portions that are stored across multiple devices to access the cryptographic key and/or asset. In one example, a portion of the seed phrase is stored at the memory device that includes the digital wallet or at a memory of the host device. In another example, the distributed portions of the seed phrase required to access the cryptographic key are stored at devices other than the host device or the removable memory device.

At 606, the host device or the memory device coupled to the host device can detect that another device is within a threshold physical distance. The threshold distance can correspond to a range of a short-range communication necessary to establish a link between the requesting device and the other device, where each device stores portions of the seed phrase required to reconstruct the seed phrase. The requesting device can thus receive portions of the seed phrase over wireless communications links. In one example, a request is generated in response to detecting that the requesting device is within a threshold distance of another device for at least a threshold time. The two devices can belong to the group of devices that store respective portions of the seed phrase. As such, a device detects the presence of the other device that belongs to the group and the respective portions of the seed phrase are combined at one device to reconstruct the seed phrase for use as authentication information.

At 608, the host device determines whether the minimum number of devices are authenticated to share seed phrase information. For example, the device seeking access to the cryptographic asset or wallet can check whether another device that stores another portion of the seed phrase belongs to the same user, which owns the cryptographic asset or the wallet (e.g., an individual) or is an authorized custodian thereof (e.g., a financial institution). As such, the devices are verified based on a preexisting association (e.g., registration) between the subset of devices.

At 610, the host device determines that the minimum number of electronic devices is not available and/or the minimum number of devices are not authenticated to share their portions of the seed phrase with the requesting device. As a result, the user seeking access to the cryptographic asset or wallet is denied. In one example, the host device can alert the owner of the cryptographic asset or wallet that an unauthorized access to the cryptographic asset or wallet was attempted. The alert can be communicated via email, SMS text messages, or any other form of messaging.

In one example, the host device can authenticate a subset of the group of devices based on one or more images captured by the requesting device as presented on displays of remaining devices of the subset of multiple devices. For example, one device can display a QR code on its display and the requesting device can capture an image of the QR code. The QR code can be used to authenticate that the device presenting the QR code belongs to the same user of the device capturing the QR code.

At 612, in response to authenticating the minimum number of devices, the host device reconstructs the seed phrase at the requesting device from the subset of the portions of the seed phrases stored at the minimum number of devices. For example, the portions of the seed phrase are assembled as the ordered set of multiple terms of the seed phrase only at the requesting device. In one example, the reconstructed seed phrase is temporary and expires after a time period. That is, the reconstructed seed phrase is based on M portions of the seed phrase retrieved from M electronic devices, where M is less than N, and is temporarily available to access the digital asset or another digital wallet.

At 614, the host device enables access to the cryptographic asset or wallet from the requesting device based on the reconstructed seed phrase. As such, the requesting device is enabled to control private keys stored at the digital wallet to access the digital assets, send or receive digital assets, and/or manage the digital assets stored on the blockchain.

At 616, the host device can delete, disable, or otherwise cause the reconstructed seed phrase to be unusable at the requesting device after expiration of a time period or some other event, for example. In one example, the reconstructed seed phrase is configured for one-time use to access the cryptographic wallet. As such, the seed phrase becomes unusable after a single use to access the cryptographic asset or wallet.

The functions performed in the processes and methods can be implemented in differing order. Furthermore, the outlined steps and operations are only provided as examples, and some of the steps and operations can be optional, combined into fewer steps and operations, or expanded into additional steps and operations without detracting from the essence of the disclosed embodiments.

The techniques introduced here can be implemented by programmable circuitry (e.g., one or more microprocessors), software and/or firmware, special-purpose hardwired (e.g., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

Figure 7:
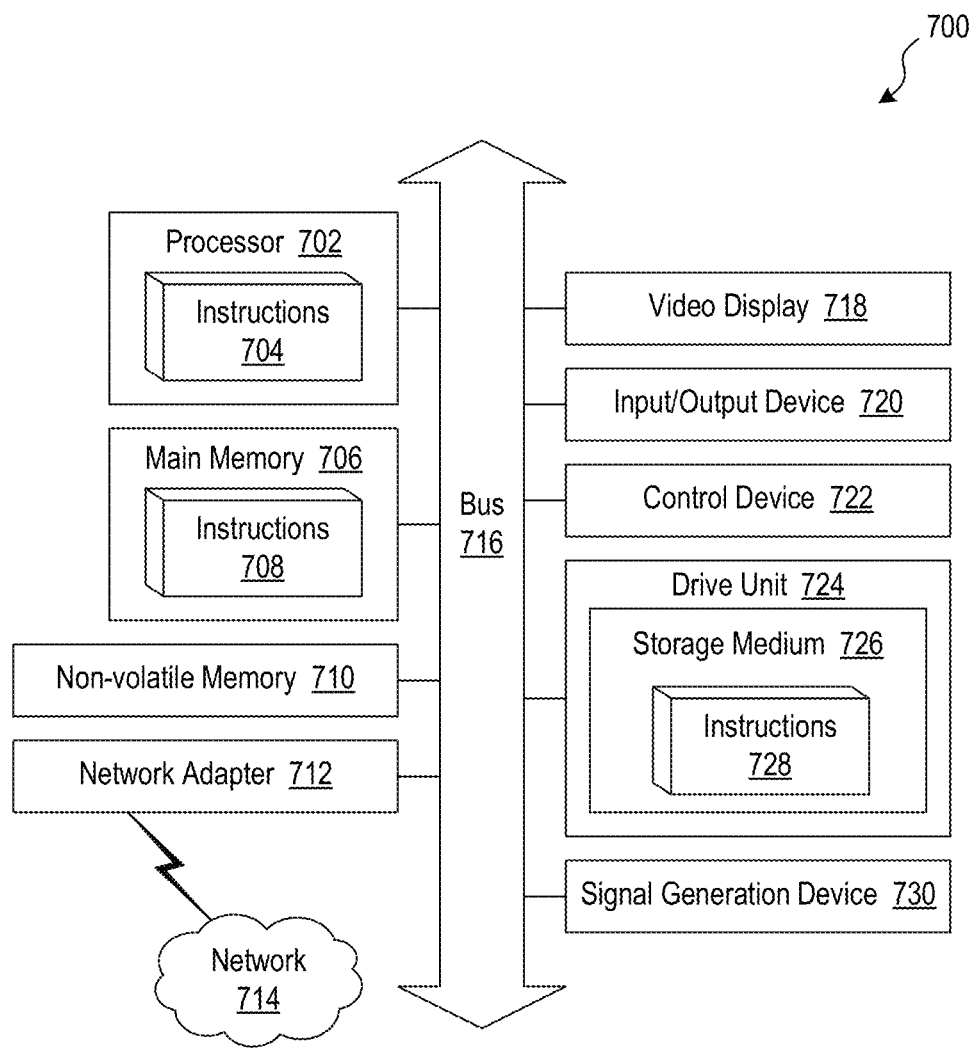
FIG. 7 is a block diagram illustrating an example computer system operable to perform aspects of the disclosed technology.

FIG. 7 is a block diagram illustrating an example computer system, in accordance with one or more embodiments. In some embodiments, components of the example computer system 700 are used to implement the systems, devices, or components illustrated in any of FIGS. 1 through 4B. At least some operations illustrates in FIGS. 5 and 6 and described herein can be implemented on the computer system 700.

The computer system 700 can include one or more central processing units ("processors") 702, main memory 706, non-volatile memory 710, network adapters 712 (e.g., network interface), video displays 718, input/output devices 720, control devices 722 (e.g., keyboard and pointing devices), drive units 724 including a storage medium 726, and a signal generation device 720 that are communicatively connected to a bus 716. The bus 716 is illustrated as an abstraction that represents one or more physical buses and/or point-to-point connections that are connected by appropriate bridges, adapters, or controllers. The bus 716, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The computer system 700 can share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the computer system 700.

While the main memory 706, non-volatile memory 710, and storage medium 726 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 728. The term "machine-readable medium" and "storage medium" shall also be taken to include any medium that is capable of storing, encoding, or carrying a set of instructions for execution by the computer system 700.

In general, the routines executed to implement the embodiments of the disclosure can be implemented as part of an operating system or a specific application, component, program, object, module, or sequence of instructions (collectively referred to as "computer programs"). The computer programs typically include one or more instructions (e.g., instructions 704, 708, 728) set at various times in various memory and storage devices in a computer device. When read and executed by the one or more processors 702, the instruction(s) cause the computer system 700 to perform operations to execute elements involving the various aspects of the disclosure.

Moreover, while embodiments have been described in the context of fully functioning computer devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 710, floppy and other removable disks, hard disk drives, optical discs (e.g., Compact Disc Read-Only Memory (CD-ROMS), Digital Versatile Discs (DVDs)), and transmission-type media such as digital and analog communication links.

The network adapter 712 enables the computer system 700 to mediate data in a network 714 with an entity that is external to the computer system 700 through any communication protocol supported by the computer system 700 and the external entity. The network adapter 712 can include a network adapter card, a wireless network interface card, a router, an access point, a wireless router, a switch, a multilayer switch, a protocol converter, a gateway, a bridge, a bridge router, a hub, a digital media receiver, and/or a repeater.

The network adapter 712 can include a firewall that governs and/or manages permission to access proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall can additionally manage and/or have access to an access control list that details permissions including the access and operation rights of an object by an individual, a machine, and/or an application, and the circumstances under which the permission rights stand.

The disclosed technology can include a machine learning (ML) system that implements models to perform at least some of the described operations. A "model," as used herein, can refer to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, the disclosed techniques can use models such as a neural network with multiple input nodes that receive data. The input nodes can correspond to functions that receive the input and produce results. These results can be provided to one or more levels of intermediate nodes that each produce further results based on a combination of lower-level node results. A weighting factor can be applied to the output of each node before the result is passed to the next layer node. At a final layer, ("the output layer") one or more nodes can produce a value classifying the input that, once the model is trained, can be used as to secure digital assets. In some implementations, such neural networks, known as deep neural networks, can have multiple layers of intermediate nodes with different configurations, can be a combination of models that receive different parts of the input and/or input from other parts of the deep neural network, or are convolutions—partially using output from previous iterations of applying the model as further input to produce results for the current input.

A machine learning model can be trained with supervised learning, where the training data includes input and a desired output, such as a seed phrase. A representation of aspects of the disclosed technology can be provided to the model. Output from the model can be compared to the desired output and, based on the comparison, the model can be modified, such as by changing weights between nodes of the neural network or parameters of the functions used at each node in the neural network (e.g., applying a loss function). After applying each of the inputs/outputs in the training data and modifying the model in this manner, the model can be trained to evaluate new outputs.

The description and drawings herein are illustrative and are not to be construed as limiting. Numerous specific details are described to provide a thorough understanding of the disclosure. However, in certain instances, well-known details are not described in order to avoid obscuring the description. Further, various modifications can be made without deviating from the scope of the embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms can be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms can on occasion be used interchangeably.

Consequently, alternative language and synonyms can be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification.

It is to be understood that the embodiments and variations shown and described herein are merely illustrative of the principles of this invention and that various modifications can be implemented by those skilled in the art.

We claim:

1. A non-transitory computer-readable storage medium storing computer instructions, which when executed by one or more processors of a smartphone, cause the smartphone to:
    detect that a memory device is inserted into a port of the smartphone,
        wherein the memory device is removably coupled to the smartphone and is configured to store a particular cryptographic wallet including (1) a cryptographic key required to access a cryptographic asset and (2) a first copy of smartphone authentication information, the smartphone authentication information relating to a pairing between a Subscriber Identify Module (SIM) identifier associated with the smartphone and the memory device; and (3) configuration information stored in association with the authentication information, the configuration information comprising a predetermined timeout setting that determines a duration of time assets in the particular cryptographic wallet are inaccessible at the memory device;
    cause the memory device to compare, at the memory device, the first copy of the smartphone authentication information stored at the memory device to a second copy of the smartphone authentication information received at the memory device from the smartphone;
    responsive to determining, based on a comparison of the authentication information, that the smartphone is authorized to communicate with the memory device, perform a first set of operations comprising:
        establish communications that enable access to the cryptographic key of the particular cryptographic wallet stored on the memory device;
        access the cryptographic asset by using the cryptographic key of the particular cryptographic wallet stored on the memory device,
            wherein the particular cryptographic asset is stored at the memory device, at another memory device of the smartphone, or at a blockchain network accessible by the smartphone; and
        perform digital management of the cryptographic asset based on user input to the smartphone; and
    responsive to determining, based on the comparison of the authentication information, that the smartphone is not authorized to communicate with the memory device, perform, by the memory device, a second set of operations comprising:
        forgo establishing communications between the smartphone and the memory device;
        determine, based on the configuration information, the predetermined timeout setting; and
        cause the cryptographic key to be inaccessible for a period of time defined by the predetermined timeout setting.

2. The non-transitory computer-readable storage medium of claim 1, wherein the smartphone is configured to generate, at least in part, the second copy of the smartphone authentication information by performing operations to:
    assemble multiple portions of a seed phrase obtained from a set of M devices including the memory device,
        wherein the multiple portions of the seed phrase are distributed across N devices, and
        wherein M=N−K where K≥1.

3. The non-transitory computer-readable storage medium of claim 1, wherein, prior to accessing the cryptographic asset, the smartphone is configured to authenticate a user based on at least one of:
    a password received at the smartphone,
    a facial feature recognizable by a facial recognition algorithm, or
    a fingerprint feature recognizable by a fingerprint recognition algorithm.

4. The non-transitory computer-readable storage medium of claim 1, wherein the memory device is at least one of:
    a secured digital (SD) card,
    an SD High-Capacity card,
    an SD Extended Capacity (SDXC) card,
    an SD Ultra Capacity (SDUC) card,
    a Compact Flash (CF) card,
    a MicroDrive (MD) card, or
    a universal serial bus (USB) drive.

5. A non-volatile flash memory card for digital management of a digital asset, the flash memory card comprising:
    a microcontroller; and
    a memory having stored thereon a particular digital wallet including (1) a key, (2) a first copy of authentication information, the authentication information relating to a pairing between a Subscriber Identify Module (SIM) identifier associated with a particular mobile device and the memory; and (3) configuration information stored in association with the authentication information, the configuration information comprising a predetermined timeout setting that determines a duration of time assets in the particular digital wallet are inaccessible at the flash memory card,
    wherein the flash memory card stores instructions which, when executed by the microcontroller, cause the flash memory card to:
        compare the first copy of the authentication information to a second copy of the authentication information received from a mobile device;
        determine responsive to determining, using the authentication information, that the mobile device is the particular mobile device and is authorized to communicate with the flash memory card when the flash memory card is inserted into a memory card slot of the particular mobile device, performing a first set of operations comprising:
            establish communication with the mobile device; and
            cause the mobile device to:

access one or more blocks on a blockchain,
wherein the one or more blocks are referenced by the key, and
wherein the one or more blocks store a digital asset; and
perform the digital management of the digital asset in response to receiving user input at the mobile device; and
responsive to determining that the mobile device is not authorized to communicate with the flash memory card, perform a second set of operations comprising:
forgo establishing communications between the mobile device and the flash memory card;
determine, based on the configuration information, the predetermined timeout setting; and
cause the key to be inaccessible for a period of time defined by the predetermined timeout setting.

6. The flash memory card of claim 5, caused, as part of performing the second set of operations, to:
cause the mobile device to send a notification to a computer device associated with a user indicated by the key stored in the flash memory.

7. The flash memory card of claim 5, wherein the flash memory card is communicatively isolated from a processor of the mobile device.

8. The flash memory card of claim 5, wherein determining that the mobile device is authorized to communicate with the flash memory card is further based on a cryptographic password.

9. The flash memory card of claim 5, wherein determining that the mobile device is authorized to communicate with the flash memory card is further performed using at least one of:
a password received at the mobile device,
a facial feature recognizable by a facial recognition algorithm, or
a fingerprint feature recognizable by a fingerprint recognition algorithm.

10. The flash memory card of claim 5, wherein the authentication information further comprises a hardware identification feature specific to the mobile device, the hardware identification feature comprising at least one of a MAC address, an International Mobile Equipment Identity (IMEI) number, an International Mobile Subscriber Identity (IMSI) number, an Integrated Circuit Card Identifier (ICCID), an eSIM identifier, or a an identifier relating to a transceiver.

11. The flash memory card of claim 5, the flash memory card being at least one of:
a secured digital (SD) card,
an SD High-Capacity card,
an SD Extended Capacity (SDXC) card,
an SD Ultra Capacity (SDUC) card,
a Compact Flash (CF) card,
a MicroDrive (MD) card, or
a universal serial bus (USB) drive.

12. The flash memory card of claim 5, wherein the flash memory card is configured to provide an air-gapped disconnect between the digital asset on the blockchain and the mobile device.

13. The flash memory card of claim 5:
wherein the key belongs to a digital wallet stored on the memory,
wherein access to the digital wallet is enabled based on a seed phrase including multiple terms, and
wherein portions of the seed phrase including the multiple terms are distributed across multiple computing devices.

14. The flash memory card of claim 13 configured to:
cause the mobile device to reconstruct the seed phrase based on the portions of the seed phrase obtained from fewer than the multiple computing devices.

15. A memory device for digital management of digital assets, comprising:
a non-transitory computer-readable storage medium storing: (i) a particular digital wallet including (1) a key, (2) a first copy of authentication information, the authentication information relating to a pairing between a Subscriber Identify Module (SIM) identifier associated with a particular smartphone and the memory device; and (3) configuration information stored in association with the authentication information, the configuration information comprising a predetermined timeout setting that determines a duration of time assets in the particular digital wallet are inaccessible at the memory device, and (ii) computer instructions, which when executed by one or more processors, cause the memory device to:
compare the first copy of the authentication information to a second copy of the authentication information received from a smartphone;
responsive to determining, using the authentication information, that the smartphone is the particular smartphone and is authorized to communicate with the memory device when the memory device is inserted into a receptacle of the smartphone, performing a first set of operations comprising:
establish communication with the smartphone; and
cause the smartphone to:
access one or more blockchain blocks referenced by the key and storing digital assets; and
perform the digital management of the digital assets; and
responsive to determining that the smartphone is not authorized to communicate with the memory device, perform a second set of operations comprising:
forgo establishing communications between the smartphone and the memory device;
determine, based on the configuration information, the predetermined timeout setting; and
cause the key to be inaccessible for a period of time defined by the predetermined timeout setting.

16. The memory device of claim 15 caused, as part of performing the second set of operations, to:
cause the smartphone to send a notification to a computer device associated with a user indicated by the key stored in the memory device.

17. The memory device of claim 15, wherein the memory device is communicatively isolated from a processor of the smartphone.

18. The memory device of claim 15:
wherein a digital wallet stored on the memory device stores the key, and
wherein access to the digital wallet is enabled based on a seed phrase that is fragmented across multiple computing devices, and
wherein the multiple computing devices includes the smartphone.

19. The memory device of claim 18, configured to reconstruct the seed phrase based on fragments of the seed phrase stored at fewer than the multiple computing devices.

20. An apparatus for digital management of digital assets, the apparatus comprising:
a non-transitory computer-readable storage medium storing (i) a particular digital wallet including (1) a key, (2) a first copy of authentication information, the authentication information relating to a pairing between a Subscriber Identify Module (SIM) identifier associated with a particular mobile device and the apparatus; and (3) configuration information stored in association with the authentication information, the configuration information comprising a predetermined timeout setting that determines a duration of time assets in the particular digital wallet are inaccessible via the apparatus and (ii) computer instructions, which when executed by one or more processors, cause the apparatus to:
subsequent to being inserted into a mobile device,
cause an electronic display of the mobile device to display a first graphical user interface (GUI) configured to request a password from a user of the mobile device,
wherein the password is to establish communication between the mobile device and the apparatus;
compare a first copy of the authentication information to a second copy of the authentication information received at the apparatus from the mobile device; and
responsive to determining, using the authentication information, that the mobile device is the particular mobile device and is authorized to communicate with the apparatus, perform a first set of operations rising:
cause the electronic display to display a second GUI for:
accessing one or more blockchain blocks referenced by the key,
wherein the one or more blockchain blocks store the digital assets, and
performing the digital management of the digital assets in response to receiving user input at the mobile device; or
responsive to determining that the mobile device is not authorized to communicate with the apparatus, perform a second set of operations comprising:
forgo establishing communications between the mobile device and the apparatus;
determine, based on the configuration information, the predetermined timeout setting; and
cause the key to be inaccessible for a period of time defined by the predetermined timeout setting.

21. The apparatus of claim 20, configured to be inserted into, and extracted from, a memory card slot of the mobile device.

22. The apparatus of claim 20 being at least one of:
a dynamic random-access memory (DRAM) stick,
a memory card,
a secure digital (SD) card,
a flash drive,
a solid-state drive (SSD),
a magnetic hard disk drive (HDD), or
an optical disc.

23. The apparatus of claim 20, wherein the key stored in the storage medium is encrypted to prevent an unauthorized mobile device from accessing the key when the apparatus is inserted into the unauthorized mobile device.

24. The apparatus of claim 20 caused to:
responsive to determining that the mobile device is unauthorized to communicate with the apparatus,
forgo displaying, by the electronic display, the second GUI as part of performing the second set of operations.

25. The apparatus of claim 20:
wherein the storage medium stores a portion of a seed phrase that is fragmented into portions stored across multiple devices,
wherein the mobile device is authorized to access the key in response to the seed phrase, and
wherein the mobile device is configured to assemble the seed phrase based on some portions obtained from fewer than all the multiple devices.

26. The apparatus of claim 20, wherein the digital assets are stored at the storage medium.

* * * * *